(12) United States Patent
Bachmann et al.

(10) Patent No.: US 10,924,490 B2
(45) Date of Patent: Feb. 16, 2021

(54) SHARING SENSOR MEASUREMENTS

(71) Applicant: Aetna Inc., Hartford, CT (US)

(72) Inventors: Alan Bachmann, Cranberry Township, PA (US); Corey Johnston, Scottsdale, AZ (US)

(73) Assignee: Aetna Inc., Hartford, CT (US)

( * ) Notice: Subject to any disclaimer, the term of this patent is extended or adjusted under 35 U.S.C. 154(b) by 228 days.

(21) Appl. No.: 16/027,956

(22) Filed: Jul. 5, 2018

(65) Prior Publication Data

US 2020/0014699 A1 Jan. 9, 2020

(51) Int. Cl.
*H04L 29/06* (2006.01)

(52) U.S. Cl.
CPC .......... *H04L 63/102* (2013.01); *H04L 63/107* (2013.01); *H04L 63/20* (2013.01)

(58) Field of Classification Search
CPC ...... H04L 63/102; H04L 63/107; H04L 63/20
USPC .......................................................... 726/1
See application file for complete search history.

(56) References Cited

U.S. PATENT DOCUMENTS

| 9,372,975 | B2* | 6/2016 | Tanioka | G06F 21/32 |
| 10,083,468 | B2* | 9/2018 | Lee | G06Q 30/0625 |
| 2006/0010252 | A1* | 1/2006 | Miltonberger | H04L 61/609 |
| | | | | 709/245 |
| 2011/0239270 | A1* | 9/2011 | Sovio | H04W 4/60 |
| | | | | 726/1 |
| 2011/0244798 | A1* | 10/2011 | Daigle | G06Q 30/0645 |
| | | | | 455/41.2 |
| 2013/0156194 | A1* | 6/2013 | Tanioka | G06F 21/62 |
| | | | | 380/277 |
| 2013/0198274 | A1* | 8/2013 | Papakipos | H04W 12/0806 |
| | | | | 709/204 |
| 2014/0229544 | A1* | 8/2014 | Evans | G06Q 50/01 |
| | | | | 709/204 |
| 2016/0373970 | A1* | 12/2016 | Kulal | H04W 36/0061 |
| 2017/0243026 | A1* | 8/2017 | Vaha-Sipila | H04L 63/20 |
| 2017/0244565 | A1* | 8/2017 | Bronk | H04L 63/0428 |
| 2018/0129205 | A1* | 5/2018 | Choi | G05D 1/0088 |
| 2018/0167370 | A1* | 6/2018 | Frahim | H04W 4/70 |
| 2018/0241489 | A1* | 8/2018 | Daoura | H04W 12/0013 |

(Continued)

OTHER PUBLICATIONS

Automating ns-3 experimentation in multi-host scenarios Alina Quereihac, Daminen Saucez, Thierry Turletti, Walid Dabbous WNS3 '15: proceedings of the 2015 Workshop on ns-3. May 2015, pp. 1-8. (Year: 2015).*

(Continued)

*Primary Examiner* — Kambiz Zand
*Assistant Examiner* — Mohammad S Shams
(74) *Attorney, Agent, or Firm* — Leydig, Voit & Mayer, Ltd.

(57) ABSTRACT

A server for sharing sensor measurements comprising one or more processors, which alone or in combination are configured to facilitate performing: receiving friend information from business to consumer (B2C) entity servers; receiving sensor information from a user device for gaining access to the sensor measurements; receiving a request for the sensor measurements from a friend device; determining whether the friend device is authorized to receive the sensor measurements based on the friend information; and sending, to the friend device, the sensor measurements in response to the friend device being authorized to receive the sensor measurements.

19 Claims, 12 Drawing Sheets

(56) References Cited

U.S. PATENT DOCUMENTS

2019/0036946 A1* 1/2019 Ruvio .................... H04W 4/44
2019/0349385 A1* 11/2019 Fox ........................ H04W 4/70
2019/0388011 A1* 12/2019 Johnson ............... A61B 5/1123
2020/0092685 A1* 3/2020 Fehrenbach ....... H04B 7/15507

OTHER PUBLICATIONS

Big Data Information Security Maintenance Natalia Miloslayskaya, Mikhail Senatorov, Alexander Tolstoy, Sergey Zapechnikov SIN '14: Proceedings of the 7th International Conference on Security of Information and Network. Sep. 2014, pp. 89-94 (Year: 2014).*

* cited by examiner

SHARING SENSOR MEASUREMENTS

BACKGROUND

Society is increasingly relying on deployment of myriads of sensors for monitoring and providing details about a state of the environment. The sensors may be networked and deployed in vehicles, homes, offices, etc. Networked sensors can exhibit local area connections such that sensor measurements are localized to authorized users of the local area network. Networked sensors can also be allowed to provide sensor measurements over the internet for increased connectivity and exchange of data.

Use of networked sensors are becoming ubiquitous in society with examples ranging from keyless entry of vehicles and homes, remotely actuating air conditioning and heating systems, remotely turning on and off lights in homes, and so on. These examples show that networked sensors are being used to gather sensitive information and exposure of this information may result in unintended consequences. Having sensitive information floating around in an open network is undesirable and as such to enhance security, data from some privately owned networked sensors are limited to local networks, e.g., a home's Wi-Fi, an office Wi-Fi, and so on.

SUMMARY

An embodiment of the disclosure provides a server for sharing sensor measurements. The server includes one or more processors, which alone or in combination are configured to facilitate performing: (a) receiving friend information from business to consumer (B2C) entity servers; (b) receiving sensor information from a user device for gaining access to the sensor measurements; (c) receiving a request for the sensor measurements from a friend device; (d) determining whether the friend device is authorized to receive the sensor measurements based on the friend information; and (e) sending, to the friend device, the sensor measurements in response to the friend device being authorized to receive the sensor measurements.

An embodiment of the disclosure provides a method for sharing sensor measurements, including: (a) receiving, at a server, friend information from business to consumer (B2C) entity servers; (b) receiving, at the server, sensor information from a user device for gaining access to the sensor measurements; (c) receiving, at the server, a request for the sensor measurements from a friend device; (d) determining, by the server, whether the friend device is authorized to receive the sensor measurements based on the friend information; and (e) sending, by the server to the friend device, the sensor measurements in response to the friend device being authorized to receive the sensor measurements.

An embodiment of the disclosure provides a computing device for accessing sensor measurements. The computing device includes one or more processors, which alone or in combination are configured to facilitate performing: (a) sending, to a server, business to consumer (B2C) account information so that friend information from B2C entity servers is accessible to the server; (b) sending, to the server, a request for the sensor measurements; (c) sending, to the server, location information; and (d) receiving, from the server, a response based on an authorization of the friend information and the location information

DETAILED DESCRIPTION

Internet of things (IoT) devices are widely available for public purchase and use without consumer-friendly methods to promote safely sharing and understanding data obtained by these devices. Private and societal resources, such as time, money, electricity, and networking traffic are being consumed by IoT devices that silo their data. That is, the data being collected is only available to the owner of the IoT device or to someone with physical access or credentials to access the owner's account pertaining to the IoT device. The IoT devices collect data but do not have processes to normalize data collected across different IoT device manufacturers. State of the art solutions that provide centralized and peer to peer sharing models have a disadvantage of administrative burden related to knowing how to intake IoT device data.

Buying, managing, and transporting sensor devices, e.g., IoT devices, everywhere an individual goes is cost prohibitive and impractical. Human senses are very limited, and IoT devices with various sensors (e.g. air quality) are increasingly augmenting the limited human senses. These sensor devices provide information pertaining several factors that can be monitored, and these sensor devices can be used to predict unfavorable/unsafe conditions. As these sensor devices continue to proliferate, society may get to a point of having digital cities that publicly provide community and regional information, but due to privacy concerns, the publicly provided information will not include private spaces, such as, homes, offices, businesses, and so on. Thus, individuals may know conditions outside but will be unable to ascertain conditions inside other people's homes without stepping into the homes.

Embodiments of the disclosure provide systems and methods for sharing private sensor data. The embodiments address several obstacles, such as managing consent and controlling data streams. These provide the advantages of providing sensor data streams in a controlled manner to certain people without compromising private network security that the sensors reside. Additionally, people can receive sensor data without physical access to the sensors or virtual access to controls of the sensors.

In an embodiment, managing consent and controlling data streams allow sharing of data that provides people the ability to fill in environmental exposure gaps in their personal health records. People that visit private property, such as other people's homes and businesses will have access to sensor data, e.g., IoT sensor data informing of air quality in the home or business, which provides additional information for making better decisions to promote healthy lifestyles. Embodiments of the disclosure allow individuals to be informed by sensor data and use the data to augment their personal health records and to guide their decisions without the individuals personally owning or managing the sensors.

Figure 1:
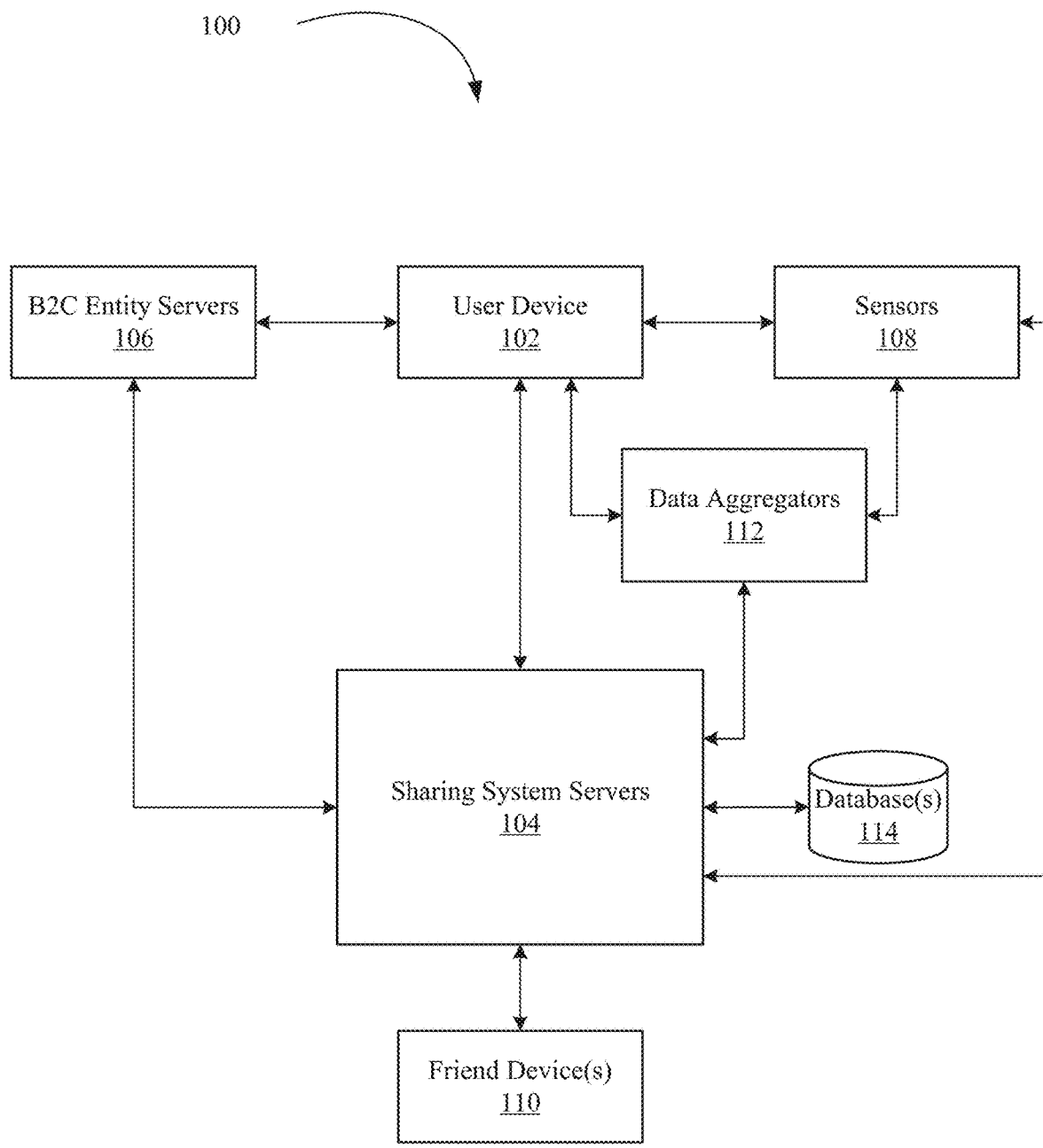
FIG. 1 illustrates a system for sharing sensor measurements according to an embodiment of the disclosure.

FIG. 1 illustrates a system 100 for sharing sensor measurements according to an embodiment of the disclosure. System 100 includes a user device 102 associated with an owner, one or more sensors 108 belonging to or accessible by the owner, sharing system servers (or sharing servers 104), B2C entity servers 106, and one or more friend device(s) 110. In some embodiments, the system 100 includes data aggregators 112 for providing access to sensor measurements through authentication. In some embodiments, the system 100 includes one or more databases 114 for data storage by the sharing servers 104.

The user device 102 and the friend device(s) 110 are computing devices used by the owner and one or more friends of the owner, respectively. For generality, the singular form will be used for the friend device(s) 110, but the use of the singular form is not a limitation to one friend device. Examples of computing devices for the user device 102 and the friend device 110 include mobile devices, for example, a smartphone, a tablet, a phablet, a smart watch, and so on. Computing devices may also include larger devices, for example, a laptop computer, a desktop computer, and so on.

The B2C entity servers 106 include one or more computing servers and devices for managing friend information on behalf of the sharing servers 104. The B2C entity servers 106 maintain an online profile for the owner, which the owner can access and oversee using the user device 102. The B2C entity servers 106 provide online credentials to the owner for accessing one or more services. Examples of B2C entity servers 106 include servers for social media platforms, servers for networking platforms, and servers for online services. B2C entity servers 106 maintian an online profile for the owner that is somehow linked or connected to one or more other online profiles on the B2C entity servers 106. The owner can create groups to manage a relationship between the owner's online profile and the other online profiles. For instance, in a social media platform, the owner can create an online social media account and can indicate members of the social media platform that are friends. Profiles of the friends of the owner are then linked together. In some embodiments, the owner can categorize the friends into different groups, for example, close friends, family, emergency contacts, best friends, and so on. Grouping friends on the social media platform allow for larger grain management of privacy settings where certain groups have more privileges with respect to what the owner shares on his/her online profile. The B2C entity servers 106 can communicate friend information to the sharing servers 104.

Sensors 108 are one or more sensor devices, monitoring devices, or measuring devices associated with the owner. The sensors 108 can be IoT sensors. Examples of sensors 108 include active and/or passive air quality sensors reporting on humidity, carbon dioxide, temperature, and so on. Sensors 108 generate measurement data and are managed by the owner through user device 102.

In an embodiment, data aggregators 112 are one or more comupting servers and devices associated with the sensors 108. Data aggregators 112 can be computing servers of manufacturers of the sensors 108. Data aggregators 112 allow the owner to register the sensors 108 through user device 102. The owner can then set up access credentials with the data aggregators 112, allowing measurement data from the sensors 108 to be stored at the data aggregators 112.

The sharing servers 104 include one or more computing servers and devices for providing measurement data to the friend device 110. The sharing servers 104 interface with the user device 102 so that the owner can police how much measurement data is provided to the friend device 110. The sharing servers 104 use the owner's B2C entity online profile to obtain friend information from the B2C entity servers 106. The sharing servers 104 receive measurement data from the sensors 108 or in some embodiments, receives measurement data from the data aggregators 112. The sharing servers 104 interface with one or more databases 114 for data and preferences storage.

Figure 2:
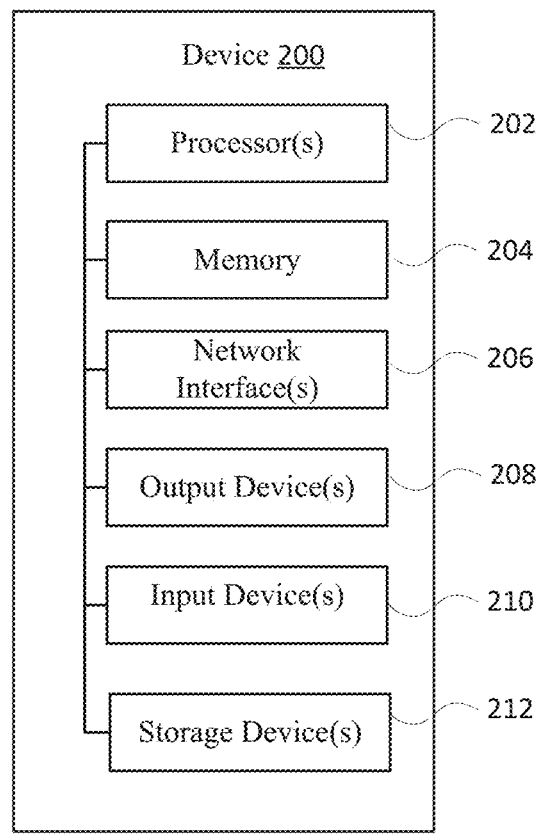
FIG. 2 illustrates a computing device according to an embodiment of the disclosure.

FIG. 2 is a block diagram illustrating basic hardware components of a computing device that may be used as servers, databases, user device 102, friend devices 110, and supplier devices 110 according to some example embodiments. Device 200 may include one or more processors 202, memory 204, network interfaces 206, output devices 208, input devices 210, and storage devices 212. Each component provided is interconnected physically, communicatively, and/or operatively for inter-component communications in order to realize functionality ascribed to the user device 102, friend devices 110, B2C entity servers 106, sharing servers 104, data aggregators 112, and databases 114. To simplify the discussion, the singular form will be used for all components identified in FIG. 2 when appropriate, but the use of the singular does not limit the discussion to only one of each component. For example, multiple processors may implement functionality attributed to processor 202.

Processor 202 is configured to implement functions and/or process instructions for execution within the device 200. For example, processor 202 executes instructions stored in memory 204 or instructions stored on a storage device 212. In certain embodiments, instructions stored on storage device 212 are transferred to memory 204 for execution at processor 202. Memory 204, which may be a non-transient, computer-readable storage medium, is configured to store information within the device 200 during operation. In some embodiments, memory 204 includes a temporary memory that does not retain information stored when the device 200 is turned off. Examples of such temporary memory include volatile memories such as random access memories (RAM), dynamic random access memories (DRAM), and static random access memories (SRAM). Memory 204 also maintains program instructions for execution by the processor 202 and serves as a conduit for other storage devices (internal or external) coupled to the device 200 to gain access to processor 202.

Storage device 212 includes one or more non-transient computer-readable storage media. Storage device 212 is provided to store larger amounts of information than memory 204, and in some instances, configured for long-term storage of information. In some embodiments, the storage device 212 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices, computers, and/or servers. The device 200 may include multiple network interfaces 206 to facilitate communication via multiple types of networks. For example, carrier system 108 can include multiple servers connected through their network interfaces to facilitate sharing of information and making requests among the multiple servers. Network interfaces 206 may include network interface cards, such as Ethernet cards, optical transceivers, radio frequency transceivers, or any other type of device that can send and receive information. Non-limiting examples of network interfaces 206 include radios compatible with several Wi-Fi standards, 3G, 4G, Long-Term Evolution (LTE), Bluetooth®, etc.

The device 200 may also be equipped with one or more output devices 208. Output device 208 is configured to provide output to a user using tactile, audio, and/or video information. Examples of output device 208 may include a display (liquid crystal display (LCD) display, LCD/light emitting diode (LED) display, organic LED display, microLED (mLED), quantum dot display, etc.), a sound card, a video graphics adapter card, speakers, magnetics, or any other type of device that may generate an output intelligible to a user of the device 200.

The device 200 may also be equipped with one or more input devices 210. Input devices 210 are configured to receive input from a user or the environment where the device 200 resides. In certain instances, input devices 210 include devices that provide interaction with the environment through tactile, audio, and/or video feedback. These may include a presence-sensitive screen or a touch-sensitive screen, a mouse, a keyboard, a camera, a microphone, a voice responsive system, or any other type of input device.

The hardware components described thus far for the device 200 are functionally and communicatively coupled to achieve certain behaviors. In some embodiments, these behaviors are controlled by software running on an operating system of the device 200.

Figure 3:
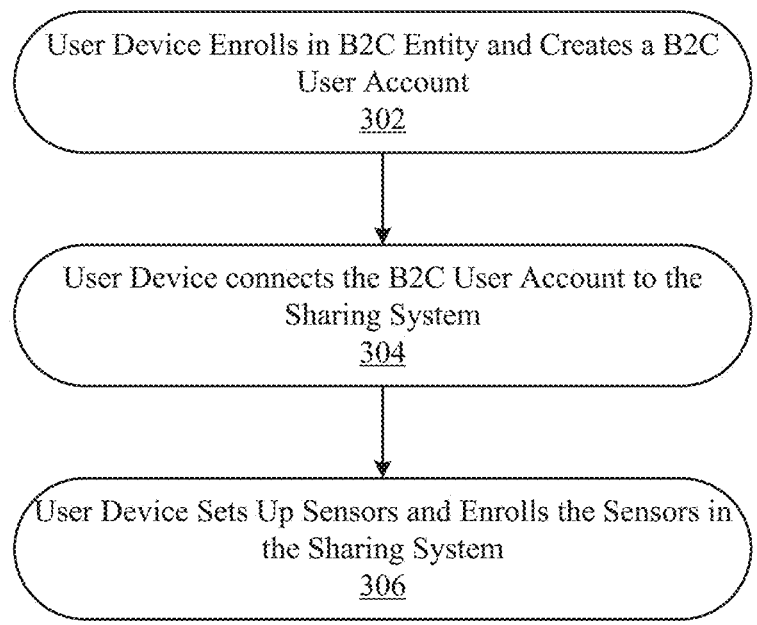
FIG. 3 is a flow diagram for setting up a business to consumer (B2C) user account with a sharing system according to an embodiment of the disclosure.

FIG. 3 is a flow diagram for setting up a business to consumer (B2C) user account with a sharing system according to an embodiment of the disclosure. At 302, the user device 102 enrolls in a B2C entity and creates a B2C user account. The user device 102 interacts with B2C entity servers 106 to set up a B2C user account profile. The B2C user account profile is associated with an identity of the owner of the user device 102. In an embodiment, the B2C user account profile includes information regarding other member profiles linked to the B2C user account profile. For example, the B2C user account profile can link to or be associated with groups or other members, which in a social media context can be indicated as group subscriptions or friends. The user device 102 manages groups and members associated with the B2C user account profile created. The user device 102 can add members to groups, subscribe to an already created group, and add/remove members as friends. The B2C user account profile stores friend information which includes members that are designated as friends and groups that have been subscribed to. The B2C user account profile is stored at the B2C entity servers 106.

At 304, the user device 102 connects the B2C user account to the sharing system. In an embodiment, the user device 102 obtains a token from the B2C entity servers 106 and provides the token to the sharing servers 104. The sharing servers 104 then use the token to access the B2C user account. In another embodiment, OAuth can be used for expediting trust between services. That is, a trust can be created for the sharing servers 104 to access the B2C user account for a certain level of access for a limited number of authorized services offered by the B2C entity servers 106 for a limited timeframe. The trust comes in the form of a token that is generated and used post authentication.

At 306, the user device 102 sets up the sensors 108 and enrolls the sensors 108 in the sharing system. In an embodiment, the user device 102 configures the sensors 108 for measuring one or more factors, e.g., temperature, pollen concentration, smoke, carbon monoxide, and so on. In an embodiment, the user device 102 registers the sensors with data aggregators 112, setting up one or more online accounts with the data aggregators 112. The online accounts allow the user device 102 to use proper credentials to view sensor measurements from the sensors 108 from any location.

The user device 102 enrolls the sensors 108 in the sharing system. In an embodiment, the online accounts set up with the data aggregators 112 are provided to the sharing servers 104 so that the sharing servers 104 can access sensor measurements. For example, using username/password combinations the sharing server 104 can access sensor measurements from each sensor in the sensors 108. The username/password combinations may be different for different sensor manufacturers.

Figure 4:
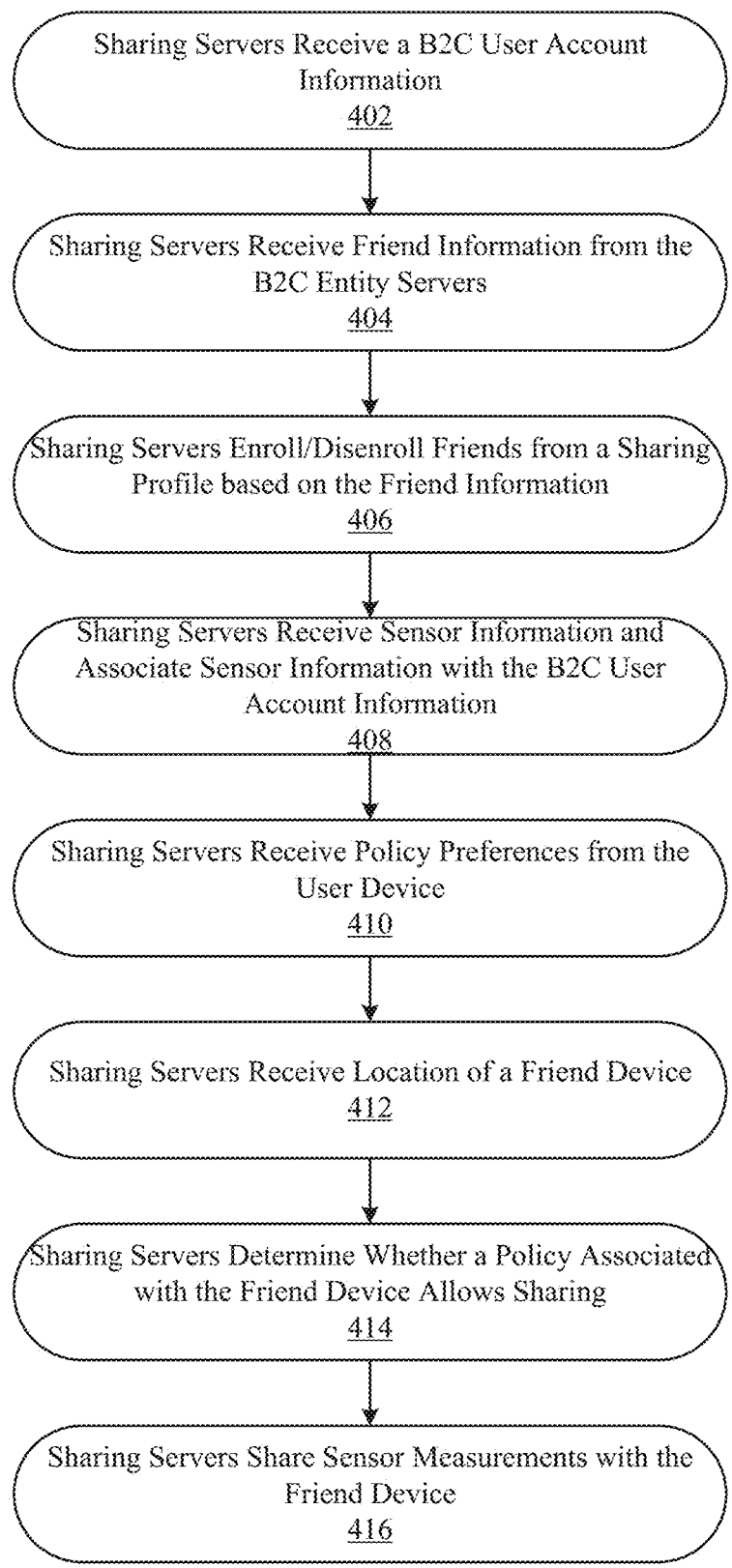
FIG. 4 is a flow diagram for sharing sensor measurements according to an embodiment of the disclosure.

FIG. 4 is a flow diagram for sharing sensor measurements according to an embodiment of the disclosure. At 402, the sharing servers 104 receive B2C user account information from the user device 102. The B2C user account information may be a token to access a B2C user account profile or a username/password combination to access the B2C user account profile.

At 404, the sharing servers 104 receive friend information from the B2C entity servers 106. Using the B2C user account information obtained at 402, the sharing servers 104 authenticate with the B2C entity server 106 to receive updated friend information from the B2C entity servers 106. The friend information may include member information for individuals that are identified as friends in the B2C user account profile. The member information may include phone number, name, grouping, etc.

At 406, the sharing servers 104 enroll/disenroll friends from a user share profile associated with the owner of the user device 102 based on the friend information obtained at 404. The user share profile is a data structure stored either on the sharing servers 104 or on databases 114. The user share profile includes friends and groups indicated in the friend information, as such, the sharing servers 104 update the user share profile based on the friend information. In a situation where a friend or group is added to or removed from the B2C user account profile, the sharing servers 104 receive updated friend information, and the friend or group is then added to or removed from the user share profile. The adding to and removing from the user share profile encompasses enrollment and disenrollment of friends. The user share profile also stores the B2C user account information obtained at 402 so that the sharing servers 104 can continually receive friend information even when the user device 102 is not authenticated to or logged on to the sharing servers 104.

In an embodiment, a user share profile is created and/or updated for each friend identified in the friend information. To distinguish the user share profile associated with the owner and the user share profile associated with a friend, the latter will be referred to as a friend share profile to enhance clarity. The creation of friend share profiles allow friend devices 110 to provide preferences on how to receive sensor measurements on the friend devices 110. The friend share profiles created identify that the owner of the user share profile is a friend.

At 408, the sharing servers 104 receive sensor information and associate sensor information with the B2C user account information. The sharing servers 104 receive sensor information from the user device 102 and add the sensor information to the user share profile that stores the B2C user account information used to obtain friend information. The sensor information can include username/password to access the data aggregators 112. The sensor information can include location of the sensors 108.

At 410, the sharing servers 104 receive policy preferences from the user device 102. The user device 102 indicate through policy preferences what sensor measurements to share with friends. The sharing servers 104 store these policy preferences in the user share profile associated with the owner of the user device 102.

At 412, the sharing servers 104 receive location of a friend device 110. The friend device 110 sends its location and friend association data to the sharing servers 104. The friend association data allows the sharing servers 104 to associate the friend device 110 to a friend identified in the user share profile. The friend association data can include a phone number.

At 414, the sharing servers 104 determine whether a policy associated with the friend device 110 allows sharing of sensor measurements. Once the friend device 110 is identified at 412, a policy associated with the friend device 110 is determined from the policy preferences from 410.

At 416, the sharing servers 104 sends sensor measurements to the friend device 110 based on the policy associated with the friend device 110. The policy associated with the friend device 110 determines whether the sharing servers 104 provide the sensor measurements to the friend device 110.

Figure 5:
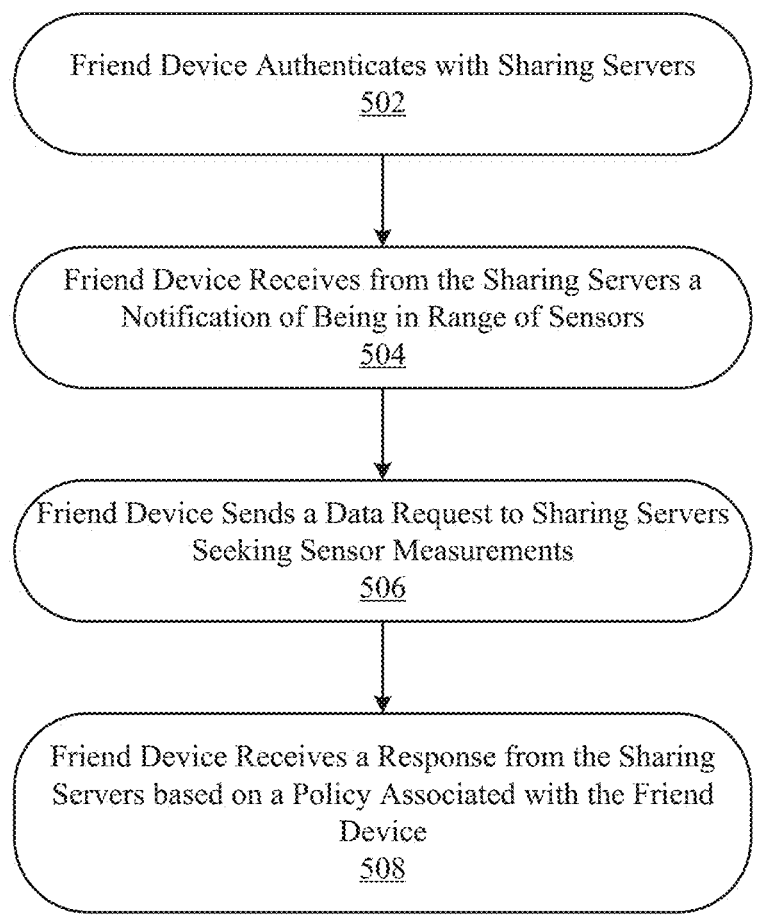
FIG. 5 is a flow diagram for receiving sensor measurements according to an embodiment of the disclosure.

FIG. 5 is a flow diagram for receiving sensor measurements according to an embodiment of the disclosure. FIG. 5 is provided from a perspective of the friend device 110. At 502, the friend device 110 authenticates with the sharing servers 104. The friend device 110 can provide friend association data or credentials to the sharing servers 104 for identifying the friend device 110.

At 504, the friend device 110 receives from the sharing servers 104 a notification of being in range of the sensors 108.

At 506, the friend device 110 sends a data request to the sharing servers 104 seeking sensor measurements from the sensors 108.

At 508, the friend device 110 receives a response from the sharing servers 104 based on a policy associated with the friend device 110.

Figure 6:
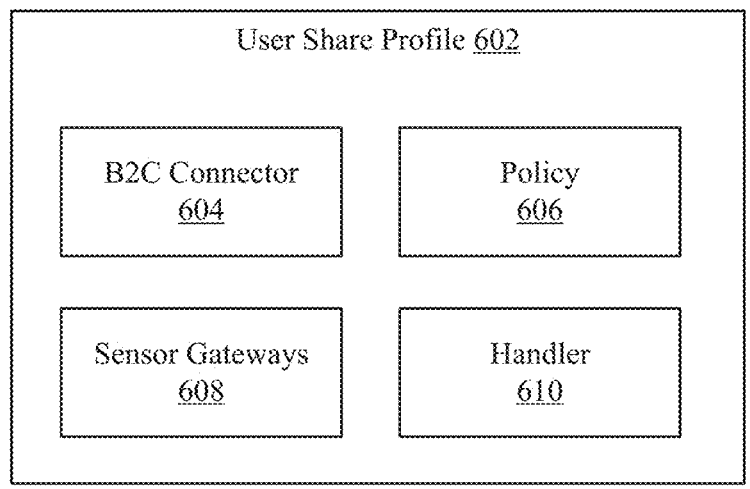
FIG. 6 illustrates components of a user share profile according to an embodiment of the disclosure.

FIG. 6 illustrates components of a user share profile 602 according to an embodiment of the disclosure. The user share profile 602 is a profile stored on the sharing servers 104 for each owner of a sensor used in the system 100. The user share profile 602 is also created for a friend of the owner of the sensor (a friend share profile). The user share profile 602 includes a B2C connector component 604, a policy component 606, sensor gateway components 608, and a handler component 610. The B2C connector component 604 includes methods for adding and removing friends from the user share profile 602. The B2C connector component 604 interfaces with the B2C entity servers 106 for adding and removing friends as described earlier. The B2C connector component 604 can also grant and deny data requests from friend devices 110 based on a friend status associated with the friend devices 110. The B2C connector component 604 can do this by providing a "yes" or "no" based on the the friend status.

The policy component 606 provides customizable limits to enforce trust levels with sensor measurements to be shared with the friend device 110. In an embodiment, the policy component 606 receives location of the friend device 110 and compares this information to the location of the sensors 108 to determine whether the friend device 110 is within an area for allowed sharing. When the friend device 110 meets policy preferences, the policy component 606 provides a "yes" for sensor measurements to be provided to the friend device 110.

The sensor gateway components 608 represent the sensors 108 accessible for sharing. Account information for accessing sensor measurements from the data aggregators 112 are stored in the sensor gateway components 608 so that the friend devices 110 do not directly obtain the account information. Additionally, the sensor gateway components 608 normalize the sensor measurements and convert these sensor measurements into preferred units. The sensor gateway components 608 also aggregate sensor measurements for sharing in a limited timeframe.

The handler component 610 includes services that a user may want to receive from a friend's sensor device. The handler component 610 includes preferences from the perspective of a data consumer. So, for example, if sharing server 104 creates a user share profile for a friend, i.e., a friend share profile, then the handler component 610 includes preferences for how data packages are provided to the friend device 110. There are several ways that the friend device 110 may choose to consume information received from the sensors 108. The handler component 610 receives from the sensor gateway components 608 limited timeframe aggregated sensor measurements. The handler component 610 packages the sensor measurements with expiration and multi-protocol support for the friend device 110. The handler component 610 provides to the friend device 110 short message service (SMS) alerts, data packages to be imported directed to an application running on the friend device 110, or application programming interfaces (APIs) to provide the sensor measurements to the friend device 110. The handler component 610 can include preferences for providing data during a certain time of day, providing data when a friend is within a certain distance from a sensor, transforming data stream into a unit that makes sense, such as Celsius or Fahrenheit, or providing data relative to conditions, such as an asthma potential scale.

Figure 7:
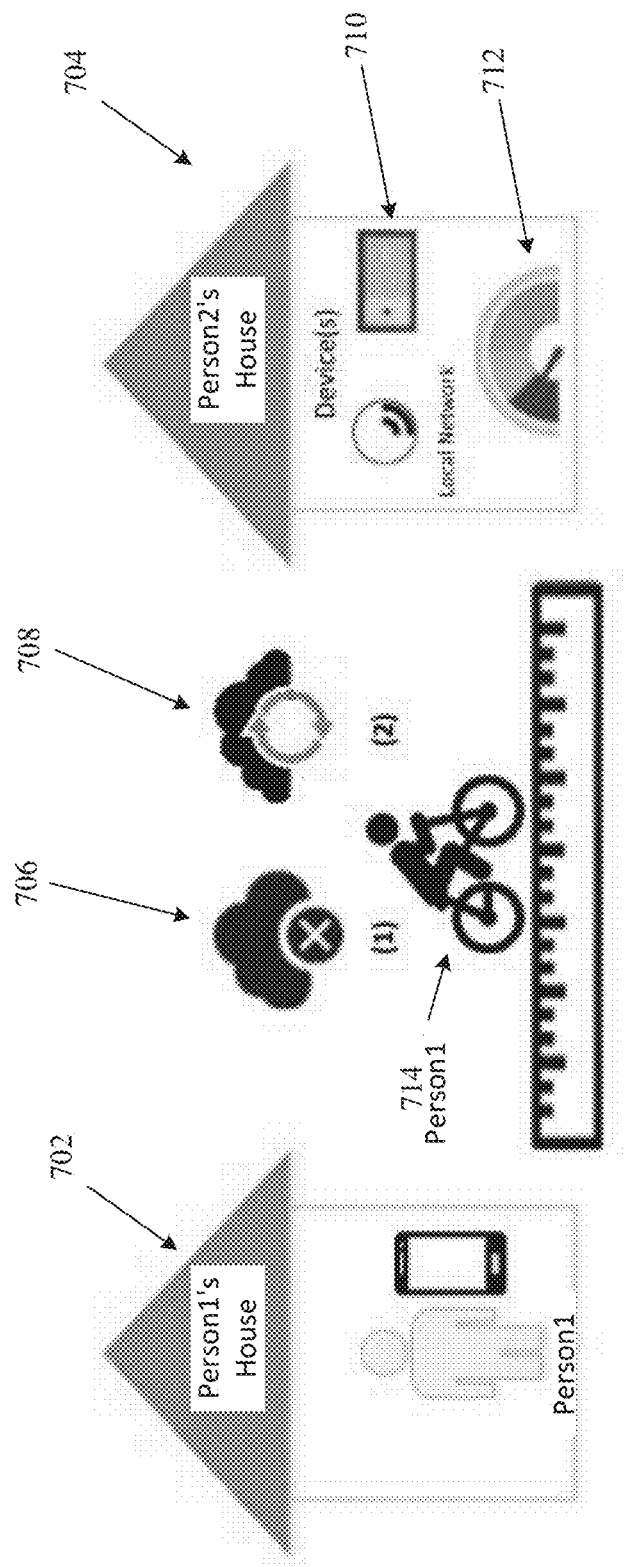
FIG. 7 illustrates use of range restriction in a user share profile according to an embodiment of the disclosure.

FIG. 7 illustrates use of range restriction in a user share profile according to an embodiment of the disclosure. FIG. 7 includes two houses, Person1's house 702 and Person2's house 704. Person2's house 704 includes one or more of Person2's devices 710. Person2's devices 710 provide a status of conditions in Person2's house 704 which is summarized in the status meter 712. Person1 714 leaves his house, heading towards Person2's house 704.

Person1 714 and Person2 are friends on a B2C service. Person2 registers Person2's devices 710 with a sharing server according to embodiments of the disclosure and grants Person1 714 access to sensor measurements as long as Person1 is within 10 miles of Person2's house 704. As Person1 714 heads towards Person2's house 704, Person1 714 is outside the 10 mile range of Person2's house 704, thus Person1 714 is unable to access sensor measurements. This state is indicated as item 706 in FIG. 7. The sharing server ascertains location of Person1 714 through location of his mobile device which is approximated using wireless technology such as Wi-Fi connections or GPS chips on the mobile device.

When Person1 714 is within the 10 mile range, attempts to download sensor measurements from Person2's devices 710 are approved as indicated by item 708 in FIG. 2. Person1 714 can then receive current conditions, e.g., temperature, dust, and so on, and insights from the sharing server.

Embodiments of the disclosure provide systems and methods for owners of sensor devices—e.g., IoT devices—in their houses, workplaces, etc., to share information with individuals without access to the information gleaned by these sensor devices. The sharing of information can be advantageous in various situations. In an example, a child has a nut or cat allergy and is visiting a home that has the specific allergen, sensor measurements can be used to determine beforehand whether the home is safe enough for the child to enter. Humans can make errors while cleaning so by sharing sensor measurements beforehand, the home can be cleared as being safe for entry before the child enters. In another example, a person has asthma or is sensitive to volatile organic compound (VOC) levels, so by having access to sensor measurements installed around a construction site, the person is able to determine that the area around the construction site is unsafe. In another example, embodiments of the disclosure remove certain guesswork inherent in variation to perceived temperature. If a person feels that a room is hot but no one else in the room confirms that the room is hot, the person may retreat and not bother. If the person has access to temperature sensors, then the person can ascertain the exact temperature of the room and determine whether he/she is having a health problem. In another example, knowing that a certain house is always too cold and damp will prevent an individual from thinking that he/she is getting the flu.

Figure 8:
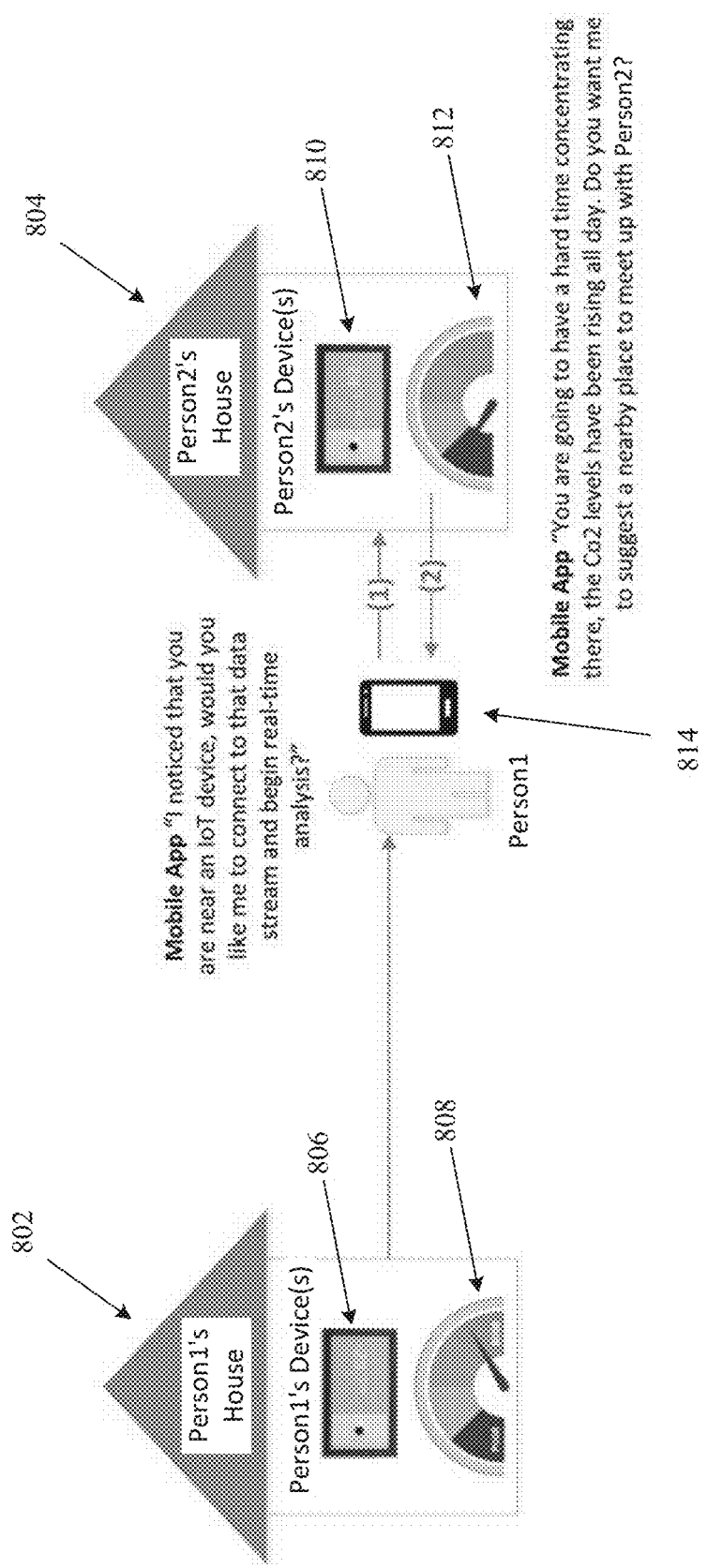
FIG. 8 illustrates a use case of sharing sensor measurements according to an embodiment of the disclosure.

Along these lines, embodiments of the disclosure provide several ways of informing behavior for overall health benefits of individuals. FIG. 8 illustrates a use case of sharing sensor measurements according to an embodiment of the disclosure. FIG. 8 includes two houses, Person1's house 802 and Person2's house 804. Person1's house 802 includes one or more of Person1's devices 806. Person1's devices 806 provide a status of conditions in Person1's house 802 which is summarized in the status meter 808 indicating that conditions in Person1's house 802 is good. In parallel, Person2's house 804 includes one or more of Person2's devices 810. Person2's devices 810 provide a status of conditions in Person2's house 804 which is summarized in the status meter 812 indicating that conditions in Person2's house 804 is poor.

As Person1 travels in the direction of Person2's house 804, Person1's mobile device 814 notifies Person1 that IoT devices are closeby for real-time analysis. After analysis, mobile device 814 indicates that Person1 is going to have a hard time due to conditions in Person2's house 804. The carbon dioxide ($CO_2$) levels in Person2's house 804 have been rising all day so mobile device 814 asks Person1 whether to change the meeting place with Person2. As illustrated in FIG. 8, using embodiments of the disclousre, Person1 does not have to place himself/herself in Person2's house 804 to have a subjective idea about potential conditions in Person2's house 804. Person1 can obtain objective measurements and interpretations of the conditions in Person2's house 804 and make a personal choice of whether to meet at Person2's house 804 or change venues. Person1 is now free to meet at different venues without the need of taking over the counter or prescription medication to counter conditions that Person1 mays be exposed to, as such Person1 does not suffer side effects and increased costs of purchasing these medication beforehand. The use case in FIG. 8 can be used for individuals with various conditions, e.g., people with sensitive skin who are sensitive to high VOCs, people who need to concentrate but are walking into an area with high $CO_2$, people with allergic reactions to dust, pollen, pet dander, people with poor circulation sensitive to temperature and humidity, and people who want to know what attire to wear based on temperature and humidity of a venue.

Figure 9:
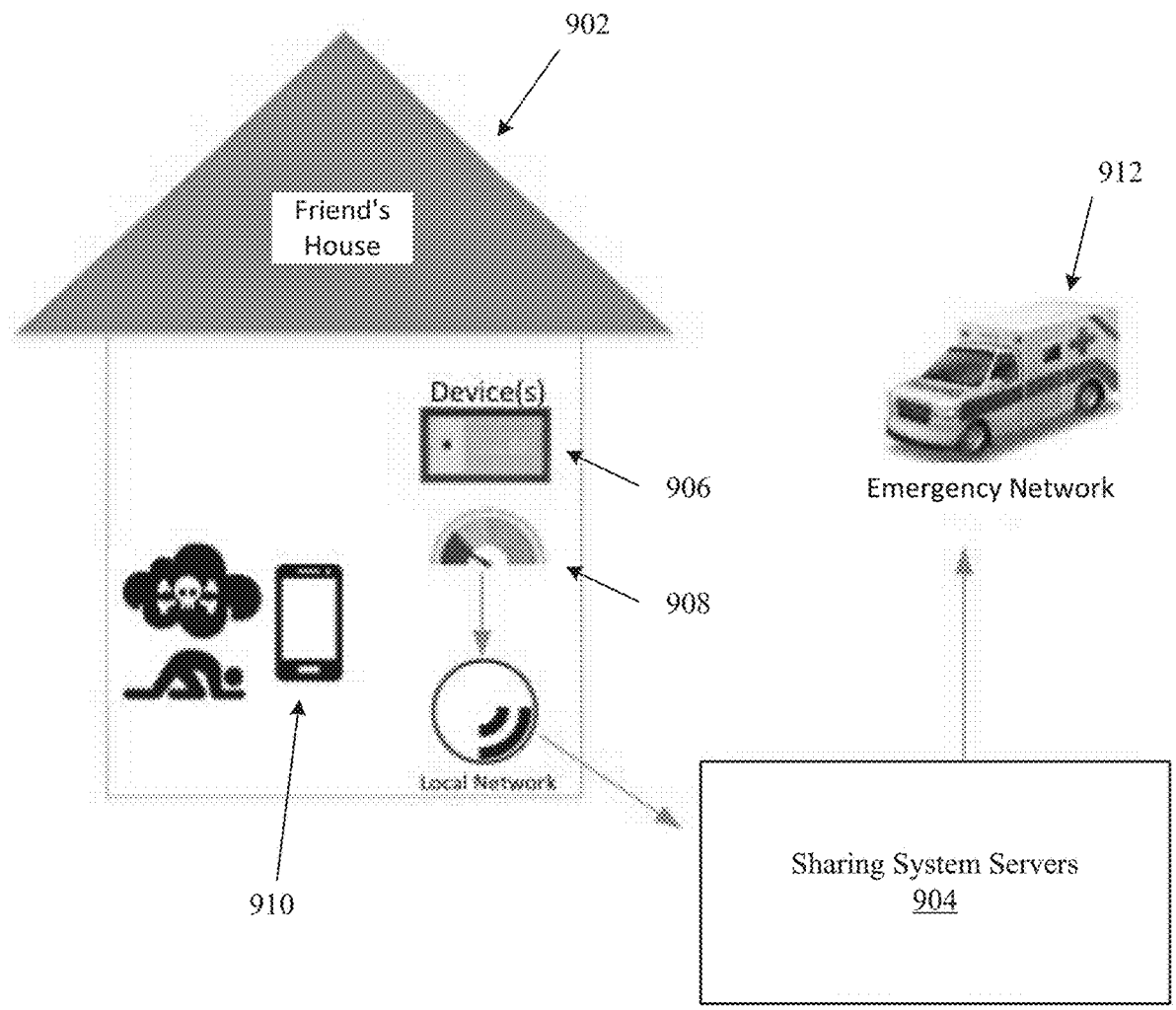
FIG. 9 illustrates an emergency use case of sharing sensor measurements according to an embodiment of the disclosure.

FIG. 9 illustrates an emergency use case of sharing sensor measurements according to an embodiment of the disclosure. FIG. 9 includes a friend's house 902, friend's sensors 906 that generate a status 908 of conditions in the friend's house 902. The measurements and status 908 generated from the friend's sensors 906 are provided to the sharing system servers 904 according to embodiments of the disclosure. In the emergency use case, an emergency network 912 registers with the sharing system servers 904 according to embodiments of the disclsoure. The sharing system servers 904 provide the emergency network 912 access to shared sensor measurements based on whether an emergency service has been activated on a mobile phone 910.

In a scenario, an owner visits the friend's house 902. The owner has no ownership or awareness of sensor devices and how those devices work at the friend's house 902. The owner becomes injured at the friend's house 902, e.g., through smoke inhalaation or some allergic reaction, and calls "911" or an emergency dispatcher for help using the mobile phone 910.

In addition to calling the emergency dispatcher, the owner or the friend can activate an emergency service on the sharing system servers 904. When the emergency service is activated, a call to the emergency dispatcher causes the sharing system servers 904 to determine whether the mobile phone 910 is at a location with sensor devices. In FIG. 9, the mobile phone 910 is located at the friend's house 902 and the friend's sensors 906 are monitoring conditions in the house. The sharing system servers 904 provide the emergency network 912 with location of the mobile device 910 and conditions of the friend's house 902 via sensor measurements obtained from the friend's sensors 906.

The emergency network 912 can dispatch emergency responders providing them with the location information and the sensor measurements so that the emergency responders can prepare specific triage plans and prep kits for the owner's injury while in route. Additionally, the emergency responders can share the sensor measurements with others (other caregivers and other first responders such as firefighters and police) for a $2^{nd}$ opinion.

Using enrollment in emergency services according to embodiments of the disclosure, diagnosis can be reached faster, care can be provided faster, and stress for everyone involved can be reduced. Potential to prevent unneeded services from patients that are unable to communicate "what happened" or "what is currently ongoing." Embodiments of the disclosure capture data for sharing with emergency personnel to help identify conditions and/or factors that may have caused or led to an allergic reaction. This may be useful even in cases where a patient is ignorant to his specific allergens.

Figure 10:
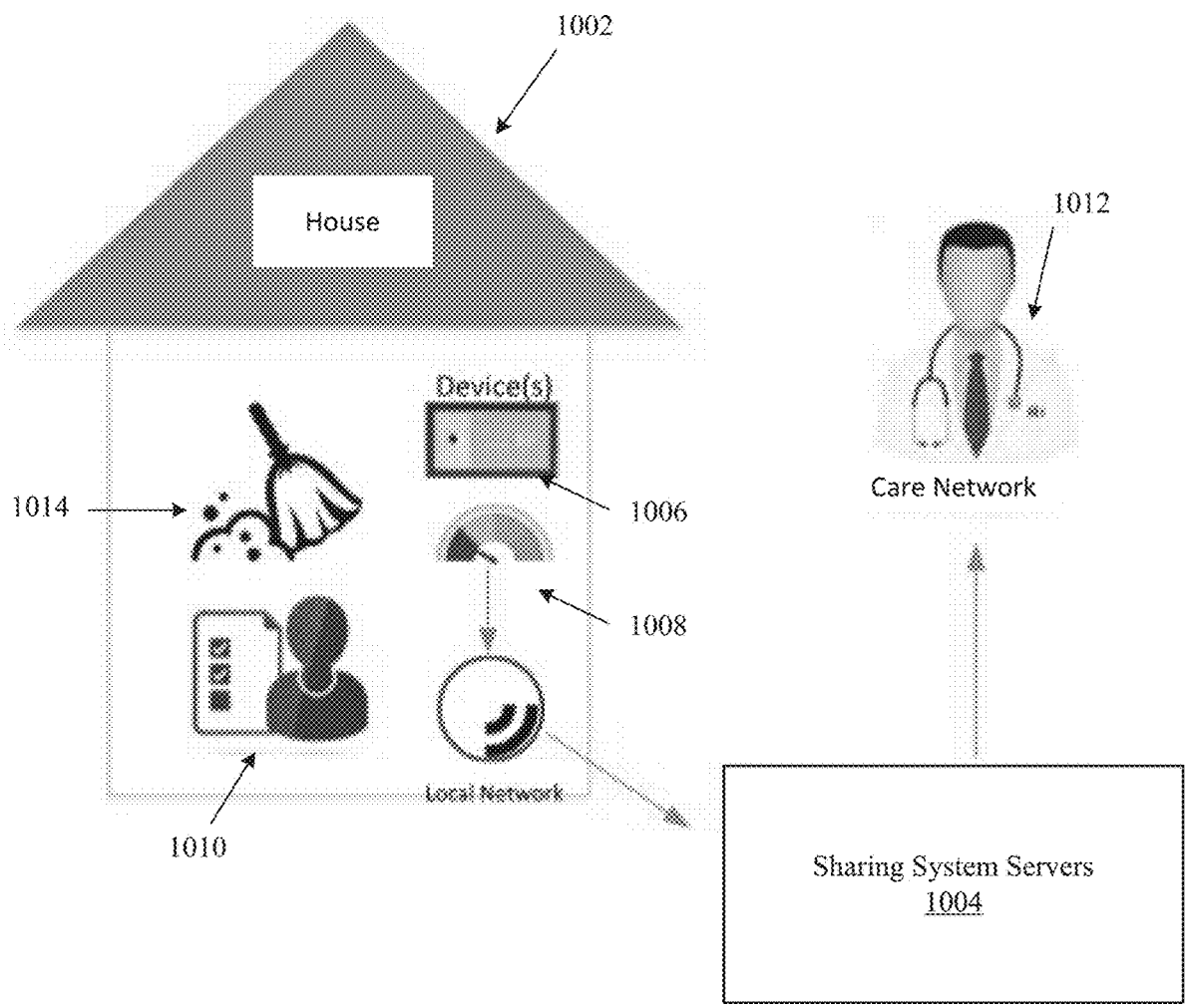
FIG. 10 illustrates a caregiver use case of sharing sensor measurements according to an embodiment of the disclosure.

FIG. 10 illustrates a caregiver use case of sharing sensor measurements according to an embodiment of the disclosure. FIG. 10 is similar to the situation in FIG. 9 except that the care network 1012 is registered or associated as a friend device according to embodiments of the disclosure. A loved one 1010 being cared for in house 1002 which has sensors 1006 providing status 1008 indicating conditions in the house 1002. When unsafe conditions are detected in the house 1002 by the sensors 1006, a message can be sent by the sharing system servers 1004 to the care network 1012 to alert nearby caregivers. The caregivers are alerted of unsafe conditions but should be in range before receiving sensor measurements. As a caregiver is en route and is within a certain range prescribed by a sharing policy, the sharing system servers 1004 then make API calls to expose sensor measurements for a limited amount of time. As such, before the caregiver reaches the house 1002, the caregiver has an idea of the status 1008 of the house 1002. Thus, diagnosis can be reached faster, care can be provided faster, and stress can be reduced for everyone invovled.

FIG. 10 can be beneficial for monitoring the elderly or people with chronic conditions that require constant quantified self-entries in their personal health record. For example, the loved one 1010 can enter health entries, schedules, and other activities into his personal health record so that changing conditions within the house 1002 can be correlated with activities. That is, a temporary dusty condition within the house 1002 can be correlated with sweeping 1014 activities at a certain time of the day. As such, a caregiver may not have to be alerted based on the expected activity and its expected effect. Regular caregivers and substitute caregivers can vary and set limits on conditions that require alerts. FIG. 10 can also be used in situations of emergency child care where a guardian may not fully trust a location that the child is being placed. In some embodiments, alerts sent to caregivers include a prescription of steps to remedy poor conditions that have been sensed.

Figure 11:
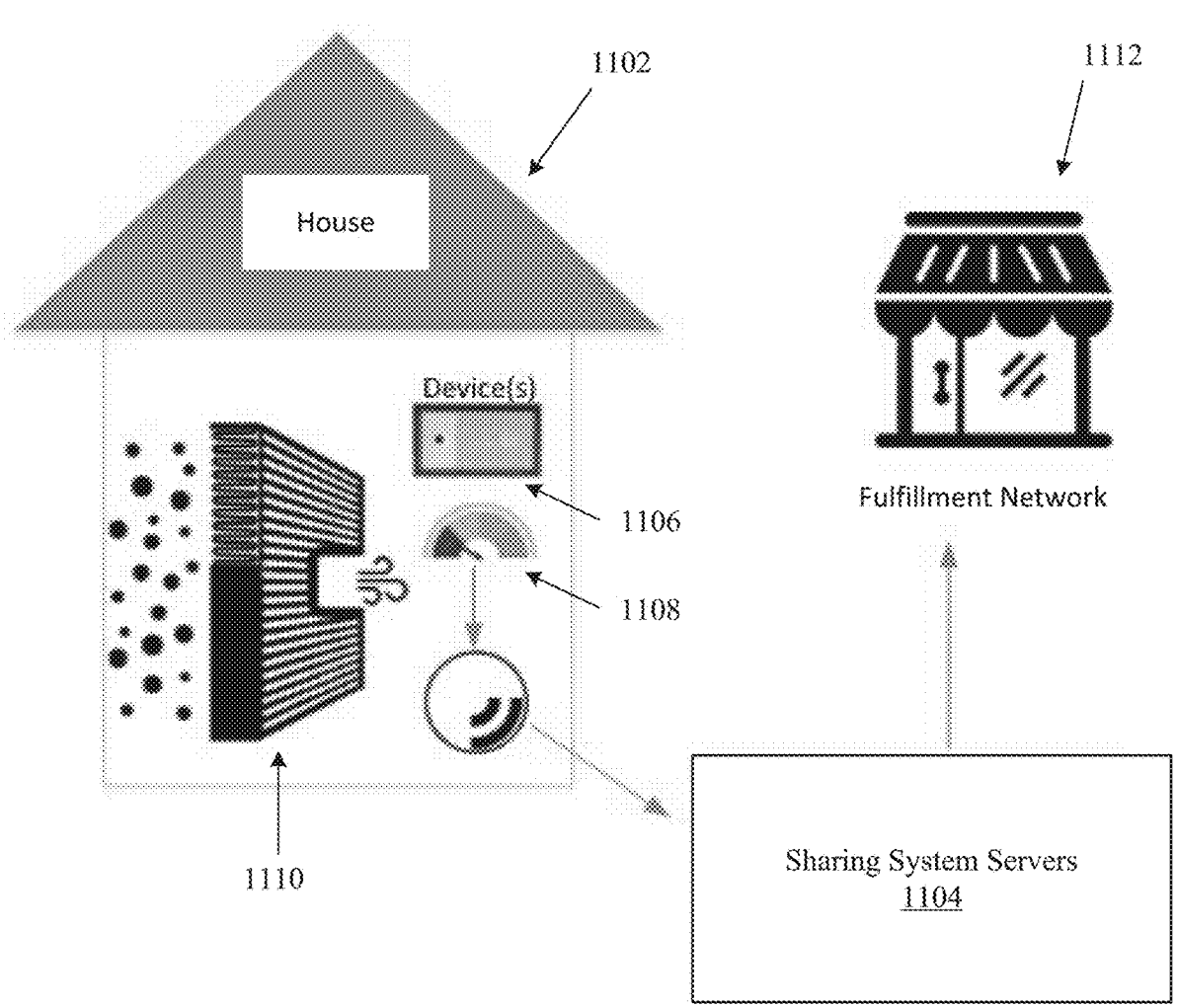
FIG. 11 illustrates a use case of sharing sensor measurements according to an embodiment of the disclosure.

FIG. 11 illustrates a use case of sharing sensor measurements according to an embodiment of the disclosure. In FIG. 11, the sharing system servers 1104 provides a caregiver or a friend of sensor measurements indicating defects or issues with the house 1102. Examples of issues include furnace failure or quality, filter replacement for air ventilator 1110. The house 1102 includes sensors 1106 that provide a status 1108 of the conditions of the house 1102 to the sharing systems servers 1104 which are then relayed to the caregiver or friend. The caregiver or friend may not know what service or product to order to solve the defect or issue with the house 1102, so the sharing system servers 1104 evaluates usage trends and evaluates status 1108 in relation to historical conditions from other invididuals' sensors collected over time. The sharing system servers 1104 expedite fulfillment of steps to remedy poor conditions in the house 1102 by making non-clininal recommendations, e.g., purchasing a plant to clean the air in the house 1102 or determining and alerting that a plant is not being cared for.

A caregiver or friend can be provided with an alert to get within range of the sensors 1106, and once in range, the sharing system servers 1104 can provide the caregiver or friend with sensor measurements from the sensors 1106. The friend or caregiver can choose to review non-clinical recommendations and sensor measurements to decide whether to stop by house 1102 to obtain more information or whether to choose a recommendation provided by the sharing system servers 1104. One recommendation can include consulting a fultillment network 1112, e.g., a store, an online store, customer service, etc., for help. For example, if a filter replacement for air ventilator 1110 is needed, the friend or caregiver can stop by a store to pick up replacement filters before going to the house 1102.

Figure 12:
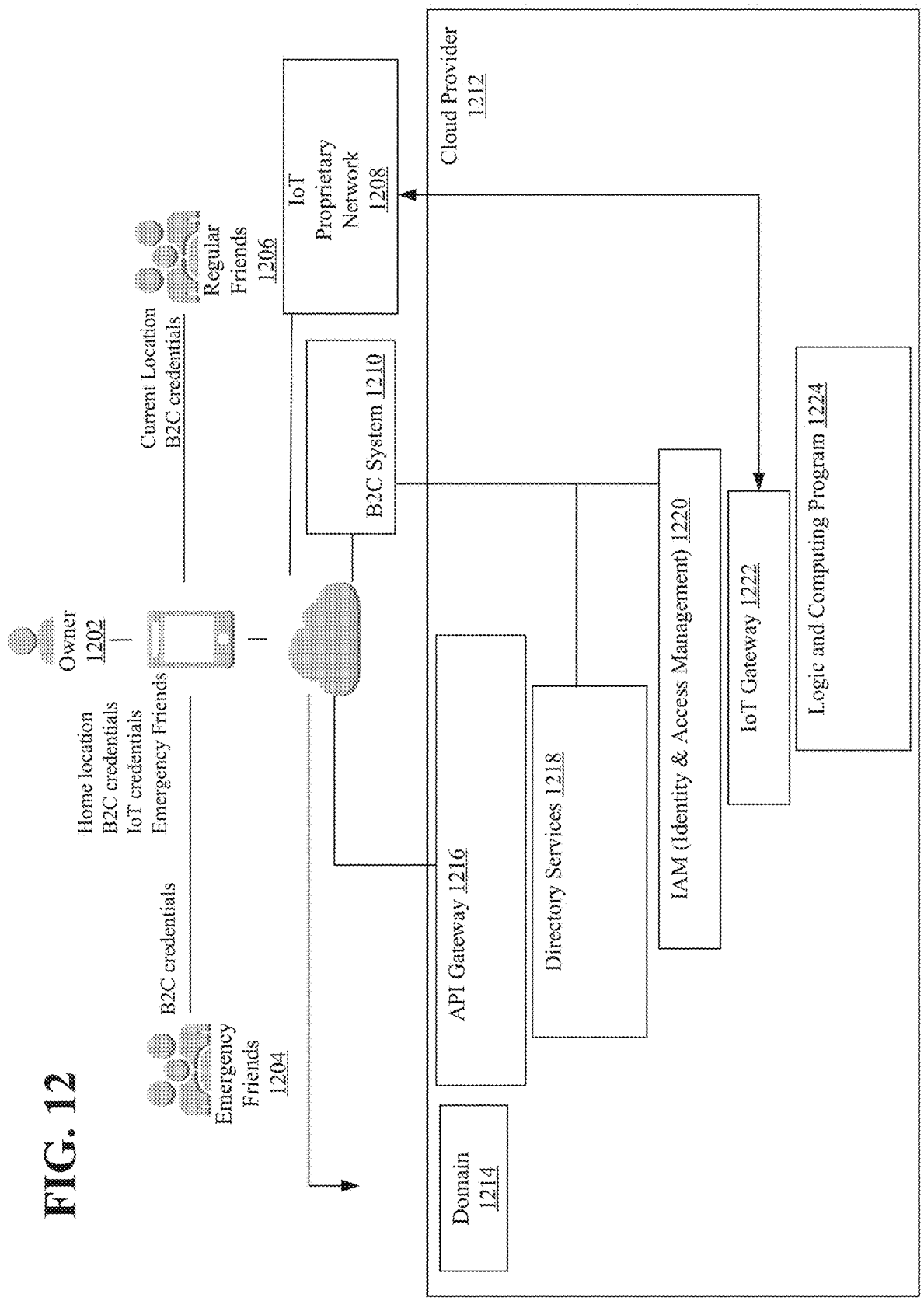
FIG. 12 illustrates a system for sharing sensor measurements using a cloud provider according to an embodiment of the disclosure.

FIG. 12 illustrates a system for sharing sensor measurements using a cloud provider according to an embodiment of the disclosure. The system includes an owner 1202, one or more emergency friends 1204, and/or regular friends 1206 interacting with a cloud provider 1212 through one or more computing devices. The system also includes a B2C system 1210 and IoT proprietary network 1208 for identity verification and access of sensor data.

Owner 1202 organizes and provides access to sensor data as previously described according to some embodiments of the disclosure. Emergency friends 1204 and regular friends 1206 receive access to sensor data as previously described in accordance to embodiments of the disclosure. In FIG. 12, the owner 1202 designates home location, provides his B2C credentials, provides IoT credentials, and can designate certain friends as emergency friends. Emergency friends 1204 use their B2C credentials to access sensor data at the home location of the owner 1202. Regular friends 1206 are provided access to sensor data based on their B2C credentials and their current location according to embodiments of the disclosure.

The B2C system 1210, e.g., the B2C entity servers 106, tracks relationship status between users of the B2C system 1210. Owner 1202, emergency friends 1204, and regular friends 1206 are signed up as users of the B2C system 1210, and a relationship or friendship status exists between them. Each of the owner 1202, emergency friends 1204, and regular friends 1206 can modify their relationship or friendship status.

IoT proprietary network 1208, e.g., the data aggregators 112, store data regarding one or more sensors owned by the owner 1202. IoT credentials provided by the owner 1202 are used to access the IoT proprietary network 1208.

The cloud provider 1212 implements functions attributed to the sharing system servers 104. In an embodiment, the cloud provider 1212 can provide domain access 1214 for accessing sensor information so that the owner 1202 or a friend of the owner 1202 can access services provided by the cloud provider 1212 through the domain access 1214. The domain access 1214 can be a webpage.

The cloud provider 1212 includes an API gateway 1216 that manages B2C authentication and integration of other ecosystems and streams. For example, the API gateway 1216 can provide CAPTCHA services to verify that a human is trying to access the sensor data. Another service that may be integrated are identity verification services such as prompting a user for a PIN number that was sent to the user's email address or mobile device.

The cloud provider 1212 includes directory services 1218 and identity & access management (IAM) 1220. The directory services 1218 and the IAM 1220 work in conjunction to determine access roles that services of the cloud provider 1212 assume when requesting information and/or changing and setting preferences. Access roles determine privileges which can include, e.g., user privileges, developer privileges, administrator privileges, etc. In an embodiment, the owner 1202 enables a B2C connector service in the cloud provider 1212, and the B2C connector service is limited to accessing only friend and relationship data from the B2C system 1210.

The cloud provider 1212 also includes the IoT gateway 1222 for accessing sensor data from the IoT proprietary network 1208. The IoT proprietary network 1208 provides sensor data to the cloud provider 1212 which is then stored and used by the logic and computing program 1224 for determining conditions at the home location of the owner 1202 according to embodiments of the disclosure. The logic and computing program 1224 can also determine whether a regular friend 1206 is within range for sharing of sensor data. The logic and computing program 1224 can get sensor data through the IoT gateway 1222 and the store data obtained.

Embodiments of the disclosure provide advantages in computing technology by providing access to sensor data across multiple networks. Data that may have been inaccessible in private networks due to privacy and security concerns can be opened up to a larger network based on social status. Opening up sensor data to a larger network incurs minimal privacy risks because credentials to access and manage the sensor data are not shared with friends seeking access to the sensor data. Therefore, embodiments of the disclosure allow access to private networks based on a friendship status established in another network.

In some areas, there are restaurants and businesses with cigarette smoking sections, and currently, individuals rely on their noses to detect a level of smoke in a room they are currently present. Some individuals weigh the tradeoffs between dining at the restaurant or conducting business at the location and finding another location. The tradeoff usually involves transportation costs already spent to arrive at the location, e.g., gas and time to get to the restaurant or business. After this analysis, some individuals just accept the poor air quality due to the sunk cost. Embodiments of the disclosure can help avoid these analyses and can help avoid having a more negative experience at a location that an individual is considering to visit. If the individual can see business conditions (various indicators for drinking water, air quality, etc.) before visiting the business, then the individual can decide whether to go someplace else well in advance. In an embodiment, businesses can offer sensor data to individuals through online advertisement in a social media platform. For example, a business can have a social media page, and members of the social network that subscribe to, thumbs up, follow, like, and/or comment on the page will be considered friends and thus be provided access to the business' sensor data.

Embodiments of the disclosure advise people on conditions of their homes and how to improve them to help them with their individual and family goals. The embodiments can show them what it will take to get to desired or ideal conditions and, in some cases, the benefits once the desired conditions are met. Embodiments of the disclosure can provide automated solutions that try to influence conditions in order to meet the desired or ideal conditions. Embodiments of the disclosure supplement information at local and regional levels since individuals can choose to share sensor data in their homes and businesses, providing information to the public that was before unavailable.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A server for sharing sensor measurements, the server comprising:
   one or more processors; and
   a non-transitory computer-readable medium having processor-executable instructions stored thereon, wherein the processor-executable instructions, when executed by the one or more processors, facilitate:
      receiving friend information from business to consumer (B2C) entity servers;
      receiving sensor information from a user device for gaining access to the sensor measurements;
      receiving policy information from the user device, wherein the policy information comprises one or more policies indicating a customizable area for sharing the sensor measurements with a friend device;
      receiving a request for the sensor measurements from the friend device, wherein the request comprises a location of the friend device;
      determining whether the friend device is authorized to receive the sensor measurements based on the friend information and the location of the friend device being within the customizable area indicated by the received policy information; and
      sending, to the friend device, the sensor measurements in response to determining the friend device is authorized to receive the sensor measurements.

2. The server according to claim 1, wherein the sensor information comprises:
   username and password combinations of one or more sensor device accounts, and/or one or more tokens for gaining access the sensor measurements; and
   location where the sensor measurements originated.

3. The server according to claim 1, wherein the sensor measurements comprise at least one of:
   temperature measurements;

air quality measurements including carbon dioxide concentration measurements, pollen concentration measurements, and/or carbon monoxide concentration measurements; and humidity measurements.

4. The server according to claim 1, wherein the processor-executable instructions, when executed by the one or more processors, further facilitate:

creating a user share profile associated with a B2C user account of an owner; and setting the one or more policies for sharing the sensor measurements within the user share profile based on the customizable area from the user device.

5. The server according to claim 4, wherein determining whether the friend device is authorized to receive the sensor measurements is further based on determining that the friend device is identified through the friend information.

6. The server according to claim 1, wherein the processor-executable instructions, when executed by the one or more processors, further facilitate:

creating a friend share profile based on the friend information; and setting one or more preferences for consumption of the sensor measurements by the friend device.

7. The server according to claim 6, wherein the processor-executable instructions, when executed by the one or more processors, further facilitate:

receiving the one or more preferences for consumption of the sensor measurements from the friend device.

8. The server according to claim 6, wherein the processor-executable instructions, when executed by the one or more processors, further facilitate:

providing an alert to the friend device informing the friend device that the sensor measurements are available.

9. The server according to claim 6, wherein the processor-executable instructions, when executed by the one or more processors, further facilitate:

providing a recommendation to the friend device based on the sensor measurements, wherein the recommendation includes a change of a meeting venue.

10. The server according to claim 1, wherein the processor-executable instructions, when executed by the one or more processors, further facilitate:

sending an error message to the friend device in response to the friend device being outside of the customizable area indicated by the received policy information.

11. A method for sharing sensor measurements, comprising:

receiving, by a server, friend information from business to consumer (B2C) entity servers;

receiving, by the server, sensor information from a user device for gaining access to the sensor measurements;

receiving, by the server, policy information from the user device, wherein the policy information comprises one or more policies indicating a customizable area for sharing the sensor measurements with a friend device;

receiving, by the server, a request for the sensor measurements from the friend device, wherein the request comprises a location of the friend device;

determining, by the server, whether the friend device is authorized to receive the sensor measurements based on the friend information and the location of the friend device being within the customizable area indicated by the received policy information; and sending, by the server and to the friend device, the sensor measurements in response to determining the friend device is authorized to receive the sensor measurements.

12. The method according to claim 11, wherein the sensor measurements comprise at least one of:

temperature measurements;

air quality measurements including carbon dioxide concentration measurements, pollen concentration measurements, and/or carbon monoxide concentration measurements; and humidity measurements.

13. The method according to claim 11, further comprising:

creating, by the server, a user share profile associated with a B2C user account of an owner; and setting, by the server, the one or more policies for sharing the sensor measurements within the user share profile based on the customizable area from the user device.

14. The method according to claim 13, wherein the one or more policies further includes:

sharing the sensor measurements with an emergency service system.

15. The method according to claim 13, further comprising:

providing, by the server, a recommendation to the friend device based on the sensor measurements, wherein the recommendation includes a change of a meeting venue.

16. A computing device for accessing sensor measurements comprising:

one or more processors; and a non-transitory computer-readable medium having processor-executable instructions stored thereon, wherein the processor-executable instructions, when executed by the one or more processors, facilitate:

sending, to a server, business to consumer (B2C) account information so that friend information from B2C entity servers is accessible to the server;

sending, to the server, a request for the sensor measurements;

sending, to the server, location information indicating a location of the computing device; and receiving, from the server, a response comprising the requested sensor measurements based on the friend information and the location of the computing device being within a customizable area indicated by one or more policies, wherein a user device provides the one or more policies indicating the customizable area for sharing the sensor measurements with the computing device.

17. The computing device according to claim 16, wherein the processor-executable instructions, when executed by the one or more processors, further facilitate:

receiving, from the server, an alert of being in range of one or more sensors configured to provide the sensor measurements.

18. The computing device according to claim 16, wherein the processor-executable instructions, when executed by the one or more processors, further facilitate:

sending, to the server, one or more preferences for consumption of the sensor measurements.

19. The computing device according to claim 16, wherein the processor-executable instructions, when executed by the one or more processors, further facilitate:

receiving an error message when either of the friend information is unauthorized or the location of the computing device is outside the customizable area.

\* \* \* \* \*